United States Patent
Nguyen et al.

(10) Patent No.: US 11,294,085 B2
(45) Date of Patent: Apr. 5, 2022

(54) MULTI-Z HORIZON AUTO-TRACKING

(71) Applicant: Landmark Graphics Corporation, Houston, TX (US)

(72) Inventors: Nam Xuan Nguyen, Katy, TX (US); Kainan Wang, Houston, TX (US); Xuewei Tan, Sugar Land, TX (US)

(73) Assignee: Landmark Graphics Corporation, Houston, TX (US)

( * ) Notice: Subject to any disclaimer, the term of this patent is extended or adjusted under 35 U.S.C. 154(b) by 373 days.

(21) Appl. No.: 16/344,345

(22) PCT Filed: Oct. 20, 2017

(86) PCT No.: PCT/US2017/057686
§ 371 (c)(1),
(2) Date: Apr. 23, 2019

(87) PCT Pub. No.: WO2018/093531
PCT Pub. Date: May 24, 2018

(65) Prior Publication Data
US 2020/0049845 A1 Feb. 13, 2020

Related U.S. Application Data

(60) Provisional application No. 62/424,334, filed on Nov. 18, 2016.

(51) Int. Cl.
*G01V 1/30* (2006.01)

(52) U.S. Cl.
CPC ........ *G01V 1/301* (2013.01); *G01V 2210/643* (2013.01)

(58) Field of Classification Search
CPC .......................... G01V 1/301; G01V 2210/643
USPC ........................................................... 702/14
See application file for complete search history.

(56) References Cited

U.S. PATENT DOCUMENTS

| | | |
|---|---|---|
| 5,056,066 A | 10/1991 | Howard |
| 9,846,964 B2 | 12/2017 | Nguyen et al. |
| 2006/0089806 A1 | 4/2006 | Fitzsimmons et al. |
| 2010/0149917 A1 | 6/2010 | Imhof et al. |
| 2012/0150447 A1 | 6/2012 | Van Hoek et al. |
| 2014/0140580 A1* | 5/2014 | Neave ............. G01V 1/345 382/109 |
| 2016/0202370 A1 | 7/2016 | Wang et al. |

(Continued)

OTHER PUBLICATIONS

Korean Intellectual Property Office, International Search Report and Written Opinion, dated Feb. 5, 2018, 14 pages, Korea.

*Primary Examiner* — Michael P Nghiem
(74) *Attorney, Agent, or Firm* — Haynes and Boone, LLP

(57) ABSTRACT

Systems and methods for automatically tracking multi-Z horizons within seismic volumes are provided. Seed data for each of a plurality of surfaces of a multi-Z horizon within a seismic volume are obtained. A data hull for each surface is generated based on the obtained seed data. A tracking region within the seismic volume is determined, based on the generated data hull. Each surface of the multi-Z horizon is automatically tracked through the tracking region. Upon determining that one or more of the plurality of surfaces violate at least one geological boundary rule associated with the plurality of surfaces, truncating the one or more surfaces such that each surface of the multi-Z horizon honors the geological boundary rule within the seismic volume.

17 Claims, 11 Drawing Sheets

(56) References Cited

U.S. PATENT DOCUMENTS

| | | |
|---|---|---|
| 2016/0209530 A1 | 7/2016 | Nugyen et al. |
| 2016/0252638 A1* | 9/2016 | Nguyen ................ G06T 15/405 702/16 |
| 2019/0265377 A1* | 8/2019 | Nguyen ................ G01V 1/302 |
| 2020/0049847 A1* | 2/2020 | Nguyen ................ G01V 1/345 |
| 2020/0363547 A1* | 11/2020 | Chan ...................... G01V 1/301 |

* cited by examiner

MULTI-Z HORIZON AUTO-TRACKING

CROSS-REFERENCE TO RELATED APPLICATIONS

This application claims priority to U.S. Provisional Application No. 62/424,334, filed on Nov. 18, 2016, the benefit of which is claimed and the disclosure of which is incorporated herein by reference in its entirety.

TECHNICAL FIELD

The present description relates generally to seismic data interpretation, and more particularly, to the interpretation of multiple Z-valued horizons from seismic data for modeling geological structures.

BACKGROUND

For purposes of hydrocarbon exploration and production, knowing the properties and locations of underground rock formations is useful for making decisions as to where and how to economically produce hydrocarbons from underground reservoirs. Seismic reflection surveys of both onshore and offshore hydrocarbon bearing formations are often performed to collect seismic data that may be used to gain an understanding of the particular geological structure of each formation. For example, such data may be used to identify geological features, such as horizons and faults, within a volume of a subsurface formation. Seismic reflection is a technique of generating seismic waves and measuring the time taken for the seismic waves to travel from the source of the waves, reflect off subsurface geological features, and be detected by an array of receivers at the surface. Each receiver's response to a single shot of seismic energy is known as a trace and is recorded for analysis. In land acquisition, seismic waves are transmitted from the surface, produced either mechanically or by explosive device. Resulting reflections from the subsurface are received at geophone sensors. In marine data acquisition surveying geological structures underlying a body of water, a water-going vessel is utilized to tow acoustic sources and seismic streamers supporting an array of hydrophones to detect reflected seismic waves.

Interpretation of seismic reflection surveys often involves analyzing multiple volumes of seismic data to identify geological structures and stratigraphic features of the subsurface formation. To facilitate such seismic data analysis, seismic interpretation tools are available for a geophysicist to "pick" horizons and other stratigraphic features within a volume of a seismic data. However, the interpretation of subsurface geological structures that have relatively complex geometries within a seismic volume can become a tedious and time-consuming process for geophysicists using conventional seismic interpretation tools. Examples of such complex structures include, but are not limited to, reverse faults, overturned beds, salt bodies, and any other structure for which different portions of the structure intersect the same seismic trace multiple times. For example, such a complex structure may be referred to as having multiple Z (or "multi-Z") points at the same X and Y location within a three-dimensional (3D) X, Y and Z coordinate space of a two-dimensional (2D) or 3D seismic volume, where Z is the depth axis through the seismic volume. Each intersection point along the Z-axis may be associated with a different surface of the same multiple Z-valued horizon to represent the complex geological structure. The interpretation of such a multi-Z horizon using conventional tools generally requires multiple, overlapping horizons or horizon segments to be manually picked from the seismic data and then, patched together so as to represent what is actually a single geological structure or event. Furthermore, any changes to the conventional interpretation may require manual updates to each of its constituent segments.

BRIEF DESCRIPTION OF THE DRAWINGS

The present disclosure is best understood from the following detailed description when read with the accompanying figures.

DETAILED DESCRIPTION

Figure 1:
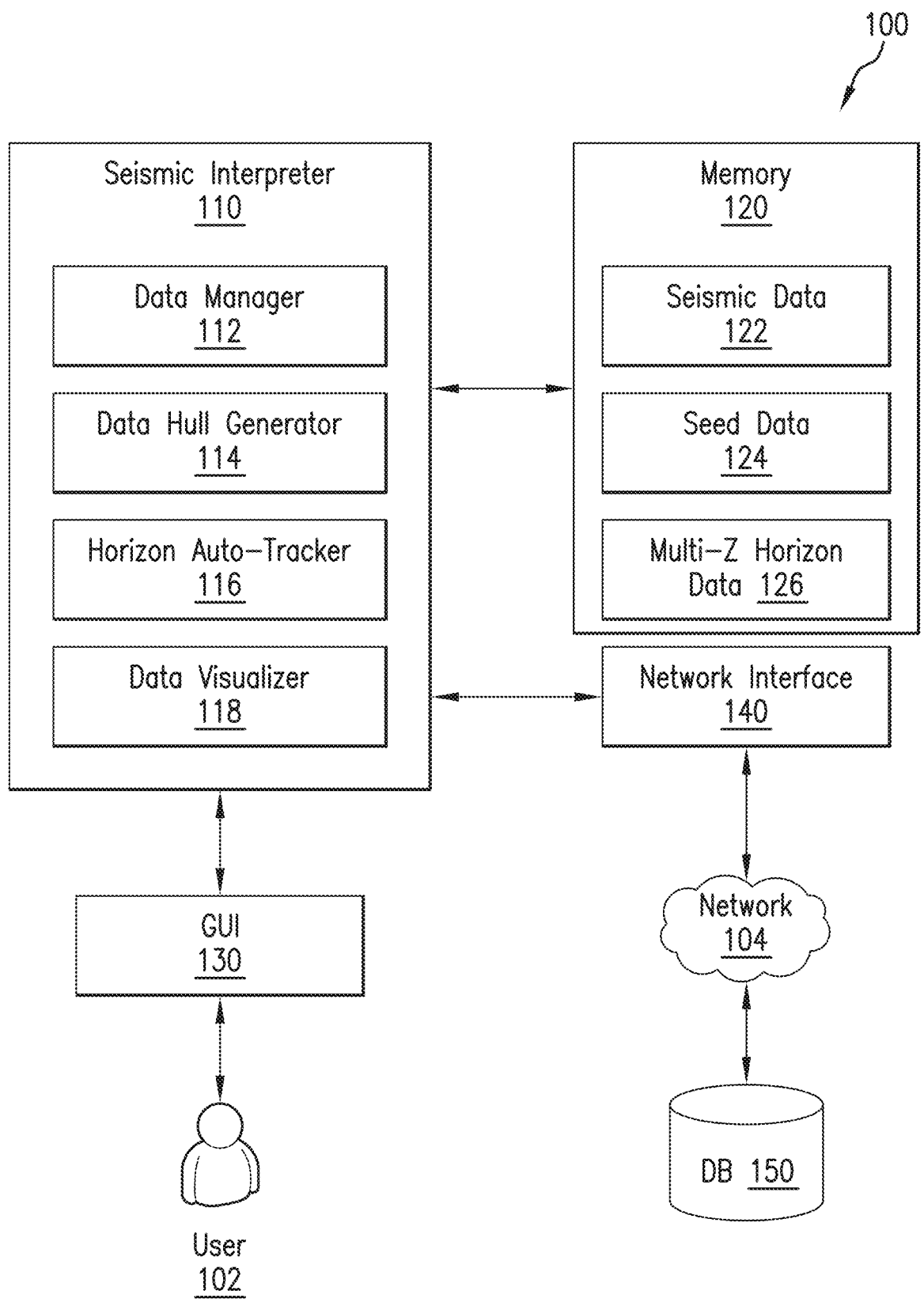
FIG. 1 is a block diagram of an illustrative system for automatically tracking (or "auto-tracking") multi-Z horizons within a seismic volume.

Embodiments of the present disclosure relate to automatically tracking (or "auto-tracking") multi-Z horizons within a seismic volume for improved seismic interpretation of complex geological structures within a subsurface formation. While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to implement such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

Also, while a figure may depict a horizontal wellbore or a vertical wellbore, it should be understood by those skilled in the art that embodiments of the present disclosure are not intended to be limited thereto and that the techniques disclosed herein may be applied to wellbores having other orientations, including deviated or slanted wellbores and multilateral wellbores or the like. Likewise, unless otherwise noted, even though a figure may depict an onshore operation, it should be understood by those skilled in the art that the apparatus and techniques according to the present disclosure are equally well suited for use in offshore operations and vice-versa. Further, unless otherwise noted, even though a figure may depict a cased hole, it should be understood by those skilled in the art that the disclosed apparatus and techniques are equally well suited for use in open-hole operations.

In the detailed description herein, references to "one or more embodiments," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

Embodiments of the present disclosure may be used to facilitate the interpretation of complex geological structures from seismic data acquired for a subsurface formation. The boundaries of such a complex geological structure may be represented by surfaces of a multi-Z horizon. Such multi-Z surfaces may be automatically "picked" or "tracked" through a three-dimensional (3D) seismic volume at multiple points along the Z-axis of a 3D XYZ coordinate space. Examples of complex geological structures that may have multi-Z surfaces include, but are not limited to, a salt body, overturned beds, and a reverse fault. The seismic volume may be derived from a 3D seismic survey of the subsurface formation (or portion thereof) and/or two-dimensional (2D) datasets along 2D seismic sections. For example, the seismic survey may have been performed for an area of the formation that has been targeted for hydrocarbon exploration and production.

In one or more embodiments, seed data for each of a plurality of surfaces of the multi-Z horizon may be used to generate a data hull for that multi-Z horizon surface within the seismic volume. For example, the seed data may be interpreted by a user from seismic data displayed within a graphical user interface (GUI) of a seismic interpretation application executable at the user's computing device. The data hull generated from the seed data may be used to define a tracking region for each surface within the seismic volume. Each surface of the multi-Z horizon may be automatically tracked or extended through the tracking region defined by the data hull within the seismic volume.

In one or more embodiments, the generated data hull may be one or more polygons specifying the boundaries of the tracking region for each surface within the seismic volume. The use of such a bounding polygon may prevent unnecessary repeated tracking of multi-Z horizon surfaces on the same seismic event, thereby improving system performance for auto-tracking operations. The shape of the bounding polygon may be determined based on various control parameters including, for example and without limitation, concavity and extrapolation. Such parameters may be specified by the user for each surface of the multi-Z horizon. This allows the user to control the shape of the data hull polygon for each surface and hence, the area of horizon tracking for that surface within the seismic volume. While the examples provided below may be described in the context of multi-Z horizons having two surfaces, e.g., a top surface and a bottom or base surface, it should be appreciated that the embodiments of the present disclosure are not intended to be limited thereto and that the disclosed multi-Z interpretation and visualization techniques may be applied to multi-Z horizons having any number of surfaces.

Illustrative embodiments and related methodologies of the present disclosure are described below in reference to FIGS. 1-7 as they might be employed in, for example, a computer system for seismic interpretation and modeling of geological structures or features of a hydrocarbon bearing formation. Such a computer system may execute a seismic interpretation application, which incorporates the multi-Z auto-tracking functionality disclosed herein. Such functionality may be provided to a user of the computing system as part of a seismic interpretation and modeling workflow for generating 2D or 3D models of the subsurface formation for purposes of hydrocarbon exploration and production. In some implementations, the computer system may be part of an overall drilling system for performing downhole operations for hydrocarbon exploration and/or production to be performed along a wellbore drilled through the formation. An example of such a drilling system will be described below in reference to FIG. 8. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

FIG. 1 is a block diagram of an illustrative system 100 for automatically tracking (or "auto-tracking") multi-Z horizons within a seismic volume. As shown in FIG. 1, system 100 includes a seismic interpreter 110, a memory 120, a graphical user interface (GUI) 130, and a network interface 140. In one or more embodiments, seismic interpreter 110, memory 120, GUI 130, and network interface 140 may be communicatively coupled to one another via an internal bus of system 100. Although only seismic interpreter 110, memory 120, GUI 130, and network interface 140 are shown in FIG. 1, it should be appreciated that system 100 may include additional components, modules, and/or sub-components as desired for a particular implementation.

System 100 can be implemented using any type of computing device having at least one processor and a processor-readable storage medium for storing data and instructions executable by the processor. Examples of such a computing device include, but are not limited to, a mobile phone, a personal digital assistant (PDA), a tablet computer, a laptop computer, a desktop computer, a workstation, a server, a cluster of computers, a set-top box, or other type of computing device. Such a computing device may also include an input/output (I/O) interface for receiving user input or commands via a user input device (not shown). The user input device may be, for example and without limitation, a mouse, a QWERTY or T9 keyboard, a touch-screen, a graphics tablet, or a microphone. The I/O interface also may be used by the computing device to output or present information via an output device (not shown). The output device may be, for example, a display coupled to or integrated with the computing device for displaying a digital representation of the information being presented to the user. The I/O interface in the example shown in FIG. 1 may be coupled to GUI 130 for receiving input from a user 102 and displaying information and content to user 102 based on the received input. GUI 130 can be any type of GUI display coupled to system 100.

Memory 120 can be used to store information accessible by seismic interpreter 110 and its components for implementing the functionality of the present disclosure. Memory 120 may be any type of recording medium coupled to an integrated circuit that controls access to the recording medium. The recording medium can be, for example and without limitation, a semiconductor memory, a hard disk, or similar type of memory or storage device. In some implementations, memory 120 may be a remote data store, e.g., a cloud-based storage location, communicatively coupled to system 100 over a network 104 via network interface 140.

Network 104 can be any type of network or combination of networks used to communicate information between different computing devices. Network 104 can include, but is not limited to, a wired (e.g., Ethernet) or a wireless (e.g., Wi-Fi or mobile telecommunications) network. In addition, network 104 can include, but is not limited to, a local area network, medium area network, and/or wide area network such as the Internet.

In one or more embodiments, seismic interpreter 110 includes a data manager 112, a data hull generator 114, a horizon auto-tracker 116 and a data visualizer 118. Data manager 112 may be used to retrieve seismic data from a seismic survey of the subsurface formation, e.g., using surface and/or downhole seismic sensors, as described above. The seismic data may be retrieved by data manager 112 from a remote data store or database 150 via network interface 140 and network 104. The retrieved seismic data may be stored within memory 120 as seismic data 122. The retrieved seismic data may include, for example, surface seismic depth images that can be used to pick multi-Z horizon layer surfaces representing the boundaries of complex geological structures. In one or more embodiments, each surface may be represented as a surface grid corresponding to a seismic section or volume or portion thereof.

In one or more embodiments, data visualizer 118 may display different views of seismic data 122 within a content viewing area or visualization window of GUI 130. For example, a 2D or 3D representation (e.g., 2D section or 3D cube view) of seismic data 122 may be displayed within the visualization window of GUI 130. GUI 130 and the information displayed therein may be presented to a user 102 via a display device (not shown) coupled to system 100. The display device may be, for example and without limitation, a cathode ray tube (CRT) monitor, a liquid crystal display (LCD), or a touch-screen display, e.g., in the form of a capacitive touch-screen light emitting diode (LED) display.

User 102 may use a user input device (e.g., a touch-screen, microphone, keyboard, mouse or other type of pointing device) coupled to system 100 to interact directly with the displayed representation of seismic data 122 for interpreting different surfaces of a multi-Z horizon of interest. The interpretation by user 102 may involve, for example, picking Z values or points along the "Z" or depth axis of a 3D XYZ coordinate space for each of a plurality of surfaces of a multi-Z horizon within a seismic volume. The user-selected points may be stored within memory 120 as seed data 124.

In one or more embodiments, data hull generator 114 may retrieve seed data 124 from memory 120 and use it to generate a data hull for each surface of the multi-Z horizon. For example, a data hull may be generated for different surfaces of the multi-Z horizon, based on seed data obtained for each surface. In one or more embodiments, the generated data hull may be a polygon specifying the boundaries of the tracking region for each surface within the seismic volume. The shape and size of such a bounding polygon may be determined based on various parameters including, for example and without limitation, concavity and extrapolation. For example, such parameters may be specified by user 102 via GUI 130 for each surface of the multi-Z horizon and stored within memory 120 as part of seed data 124.

In one or more embodiments, horizon auto-tracker 116 may use the generated data hull to determine or define a tracking region for the multi-Z horizon within the seismic volume. Horizon auto-tracker 116 may then automatically track each surface of the multi-Z horizon through the tracking region within the seismic volume. Information relating to the auto-tracked multi-Z horizon may be stored in memory 120 as multi-Z horizon data 126. Additionally, a graphical representation of the auto-tracked horizon surfaces may be generated by data visualizer 118 and displayed to user 202 via a visualization window of GUI 130.

Figure 2:
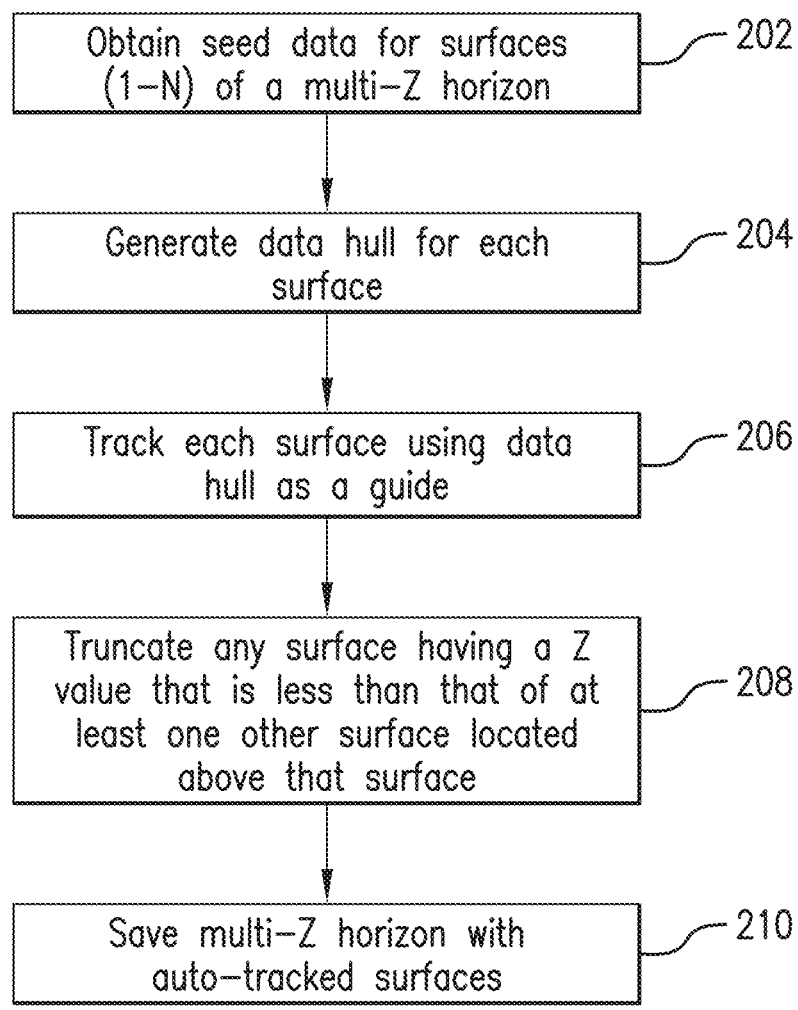
FIG. 2 is a flowchart of an illustrative process for auto-tracking a multi-Z horizon within a seismic volume.

FIG. 2 is a flowchart of an illustrative process 200 for auto-tracking a multi-Z horizon within a seismic volume. In block 202, seed data is obtained for each of a plurality of surfaces of a multi-Z horizon within a seismic volume. In one or more embodiments, each surface of the multi-Z horizon may be assigned a numerical identifier (or "ID") ranging from 1 to N, where N may be any positive integer value, e.g., based on a predetermined or user-specified maximum number of surfaces for the multi-Z horizon. As will be described in further detail below, the ID assigned to each surface may correspond to a depth level or position of that surface relative to other surfaces of the multi-Z horizon, where the surfaces are assigned IDs in an ascending order from the top-most surface having the smallest depth or Z value (and smallest or lowest ID number) to the bottom-most or deepest surface having the largest depth/Z value (and largest or highest ID number). However, it should be appreciated that any numbering scheme may be used for identifying different multi-Z surfaces according to their relative locations or order within a subsurface formation.

In one or more embodiments, the seed data obtained for each surface in block 202 may represent an initial interpretation of the surface within the seismic volume. In one or more embodiments, the horizon seed data includes one or more seed points for the surface. The seed point(s) may be selected by a user using a user input device (e.g., a mouse or other pointer device) from a representation of the seismic volume displayed within a visualization window of a GUI, e.g., GUI 130 of FIG. 1, as described above. For example, the seismic volume may be displayed within the GUI as a 2D representation of seismic data traces from a corresponding portion of a 3D seismic survey. Thus, each user-selected seed point in this example may represent a location along a seismic trace at a depth or Z value corresponding to at least one surface of the multi-Z horizon, as picked by the user within the seismic volume.

Figure 7:
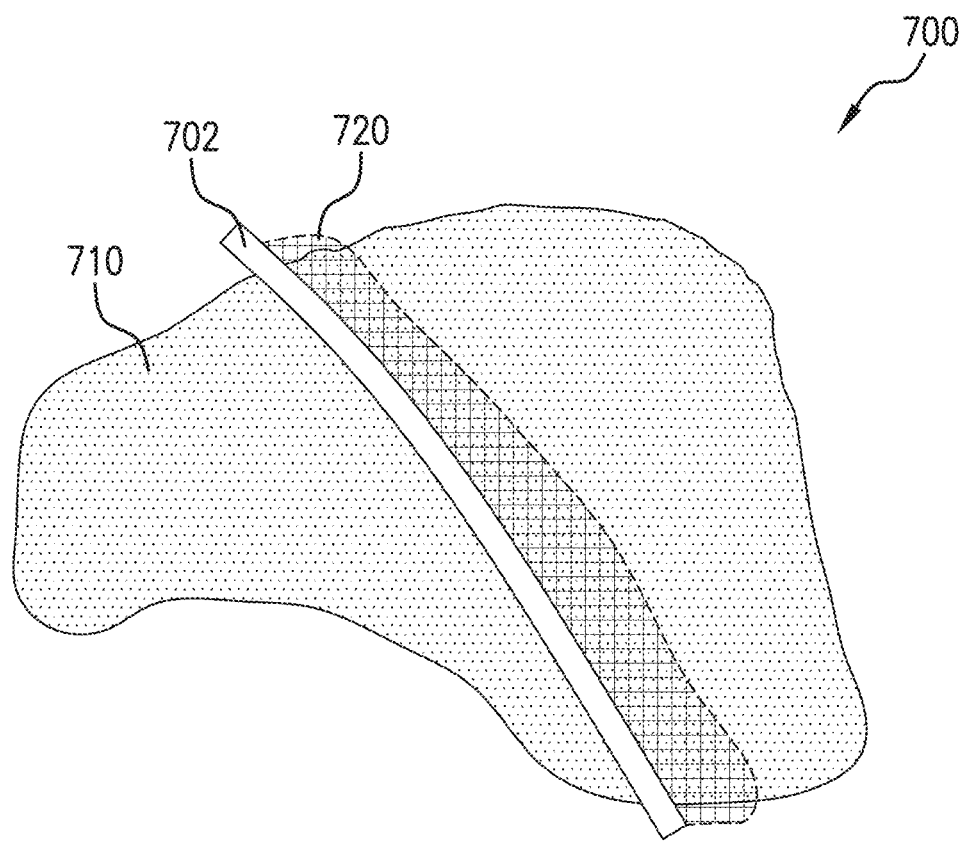
FIG. 7 is a diagram of an illustrative a bounding polygon for limiting auto-tracking of multi-Z horizons to a specified area of interest within a seismic volume.

In block 204, the seed data obtained in block 202 may be used to generate a data hull for each surface of the multi-Z horizon. Examples of data hulls generated for different faulted surfaces of a multi-Z horizon are shown in FIG. 7, as will be described in further detail below.

In one or more embodiments, the generated data hull may be a polygon defining an area or region of interest within the seismic volume in which surfaces of the multi-Z horizon are to be tracked. Such a polygon may be generated based on one or more parameters for controlling various attributes of the polygon. In one or more embodiments, such polygon parameters may be specified by the user via a control panel or user settings window of the GUI. For example, in addition to the seed data obtained for each surface, block 202 may also include obtaining one or more user-specified parameters for controlling the shape, size, and/or other attributes of the polygon and thereby, also controlling the boundaries of a region defined by the polygon within the seismic volume for tracking or extending each surface through the volume, as will be described in further detail below. In some implementations, the data hull generated for a surface in block 204 may include multiple polygons for automatically tracking the surface within the seismic volume.

In block 206, the generated data hull or polygon(s) for each surface of the multi-Z horizon in this example may be used to automatically track or extend the respective surfaces through the seismic volume. In one or more embodiments, block 206 may include determining a tracking region within the seismic volume for each surface of the multi-Z horizon, based on the corresponding data hull or bounding polygon(s) generated in block 204. Accordingly, each multi-Z horizon surface may be automatically tracked through the corresponding tracking region within the seismic volume. In this way, the data hull is used to guide the tracking of each surface through the seismic volume.

In one or more embodiments, the generation of the data hull from the seed data and determination of the tracking region from the data hull may be performed as part of a pre-processing procedure for automatically defining an optimal area of interest for auto-tracking each surface within the seismic volume. Such pre-processing may prevent any unnecessary repeated tracking of multi-Z horizon surfaces for the same geological structure or seismic event within the seismic volume. This is in turn optimizes system performance for auto-tracking.

In one or more embodiments, one or more of the auto-tracked surfaces from block 206 may be truncated in block 208 to ensure that the auto-tracked multi-Z horizon provides a relatively accurate geological representation of the actual surfaces of the subsurface formation. For example, block 206 may include performing various operations to ensure that an auto-tracked surface having a relatively small depth value (and assigned a relatively lower ID) is always positioned above a surface having a relatively larger depth value and higher ID. The truncation in block 208 may be performed after all of the surfaces have been auto-tracked or while the auto-tracking is in progress. For example, in some implementations, multiple surfaces may be auto-tracked simultaneously and any truncation of surfaces may be performed while the surfaces are auto-tracked through the tracking region within the seismic volume. In one or more embodiments, the truncation in block 208 may be performed using the process illustrated in FIG. 3.

Figure 3:
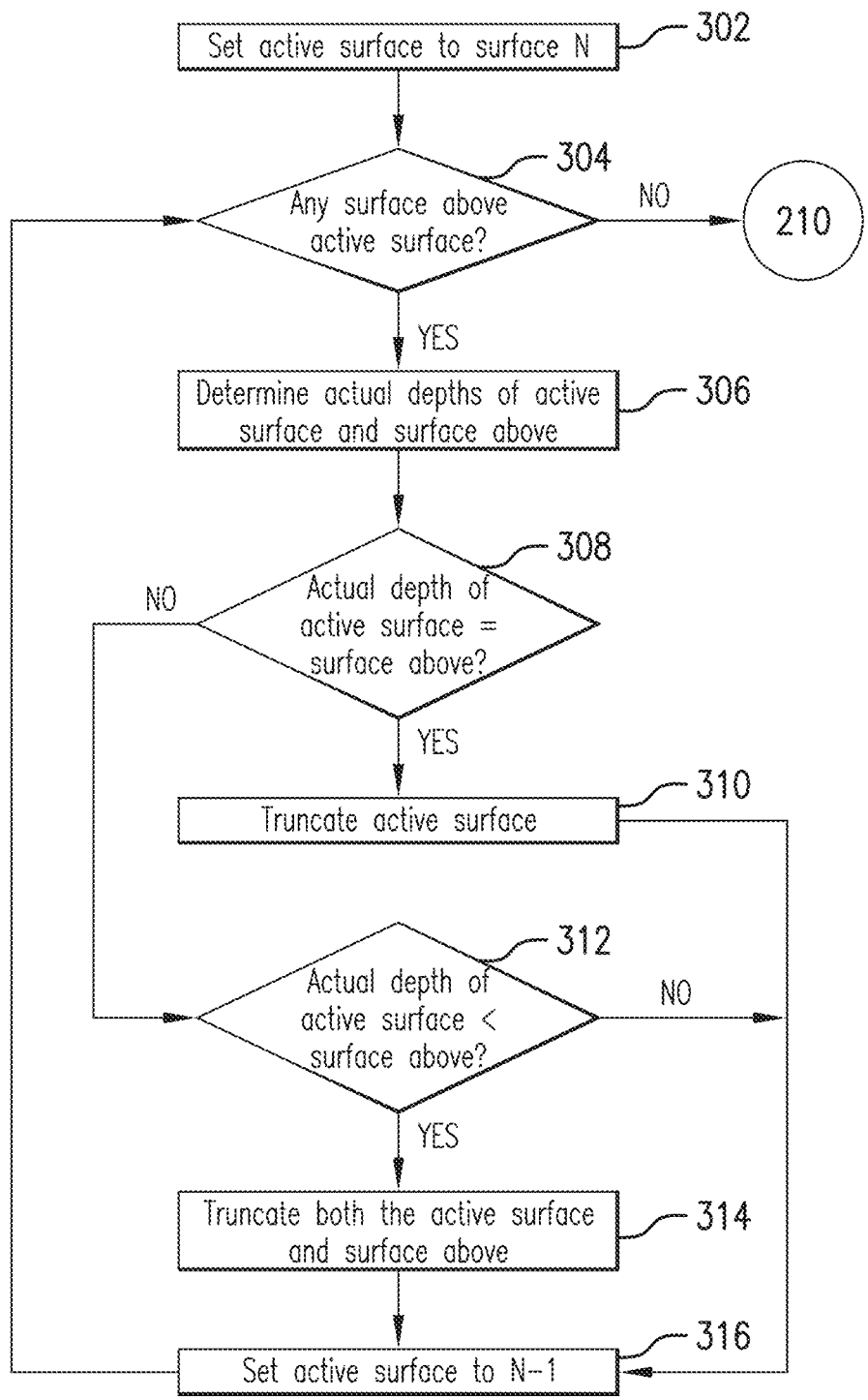
FIG. 3 is a flowchart of an illustrative process of truncating auto-tracked surfaces of a multi-Z horizon.

FIG. 3 is a flowchart of an illustrative process 300 of truncating one or more auto-tracked surfaces of a multi-Z horizon such that each surface honors geological boundary rules within the seismic volume. Such rules may be used to ensure that the boundaries and relative positions of the auto-tracked surfaces are consistent with the geological boundaries and positions of actual multi-Z surfaces within the seismic volume. The relative position of each surface within the seismic volume may be represented by the ID number assigned to that surface. As described above, the ID assigned to each surface may be based on the depth or Z value associated with that surface relative to that of the other surfaces. Also, as described above, the number of surfaces and corresponding ID numbers may range from 1 to N, where N may be any positive integer value and the ID numbers are assigned to surfaces in ascending order from the top-most or shallowest surface to the bottom-most or deepest surface of the multi-Z horizon.

In one or more embodiments, each of the surfaces of the multi-Z horizon may be sequentially processed according to their respective IDs and relative depth positions within the seismic volume to determine whether or not any geological boundary rules are being violated. In the example shown in FIG. 3, process 300 begins in block 302, which includes setting the current or active surface to be processed to surface N, i.e., the bottom-most surface of the multi-Z horizon. Thus, each surface in this example may be sequentially processed in remaining surface in the sequence until the top-most surface (ID=1) is processed. In some implementations, the active surface may be set to any of the surfaces of the multi-Z horizon at any time, based on input received from a user, e.g., user 102 via GUI 130 of FIG. 1, as described above. For example, the user may specify the active surface to be processed initially or at any time thereafter by selecting the ID of a particular surface via a dropdown menu or other user control element provided within the GUI.

For purposes of this example, only one geological rule will be taken into account, namely that all points associated with a surface assigned a relatively smaller ID number must have smaller depths than the points associated with a surface assigned a relatively larger ID number such that the smaller ID surface remains above (or at a higher depth position than) the larger ID surface. However, it should be appreciated that embodiments of the present disclosure are not intended to be limited thereto and that the disclosed techniques may be applied for truncating surfaces based on any number of geological rules as desired for a particular implementation.

In block 304, it is determined whether or not any surface having a relatively smaller ID exists above the active surface. The determination in block 304 may be based on an analysis of seismic data traces associated with the active surface within the seismic section. For example, each seismic trace may be analyzed to determine whether a data point associated with another surface having a smaller ID exists along the same seismic trace at a lower depth position or above at least one data point associated with the active surface. As described above, the relative depth position of each surface may be based on or correspond to the ID assigned to that surface, where surfaces having relatively smaller depth positions (and smaller depth values) are assigned IDs having relatively smaller values.

If it is determined in block 304 that no surfaces exist above the active surface and because the active surface in this example was initially set to the bottom-most surface or surface N, it may be assumed that all surfaces have been processed and process 300 may conclude by proceeding to block 210 of process 200 of FIG. 2, as will be described further below.

However, if it is determined in block 304 that at least one surface having a smaller ID is located above the active surface, process 300 proceeds to block 306, which includes determining the actual depths of data points along the active surface and the lower ID surface that is supposed to be located above the active surface. The actual depths of points along each surface are then used to determine whether any portion of the active surface is located at a depth that is equal to any portion of the lower ID surface (block 308) or whether any portion is located at a depth that is higher than (or above) any portion of the lower ID surface (block 312).

Figure 4A:
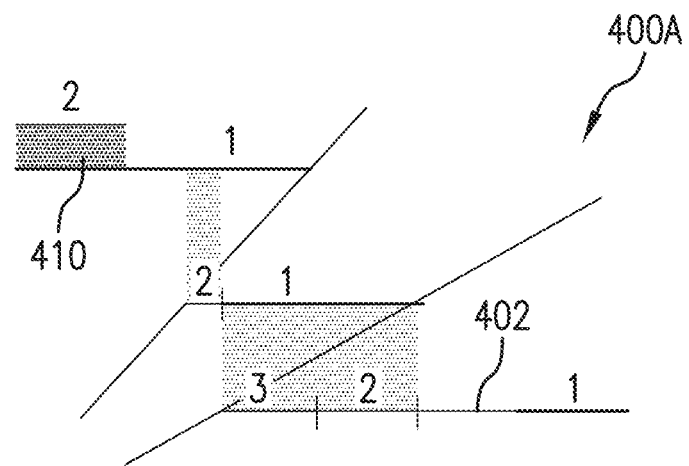
FIGS. 4A and 4B are diagrams illustrating the truncation of faulted surfaces of a multi-Z horizon.

If it is determined in block 308 that the actual depth of the active surface is equivalent to that of the lower ID surface above, the active surface is truncated in block 310. For example, as shown in FIG. 4A, a segment 402 of an active surface (ID=2) of a multi-Z horizon 400A is located at a depth that is equal to a lower ID surface (ID=1). Segment 402 of the active surface in this example may overlap a portion of the lower ID surface. Thus, the active surface may be truncated by deleting segment 402 such that the active surface no longer overlaps the portion of the other surface, as shown for multi-Z horizon 400B in FIG. 4B. It should be appreciated that the surfaces in this example may have been previously separated according to predetermined edge points that define and/or mark the boundaries of each surface within the seismic volume.

Figure 4B:
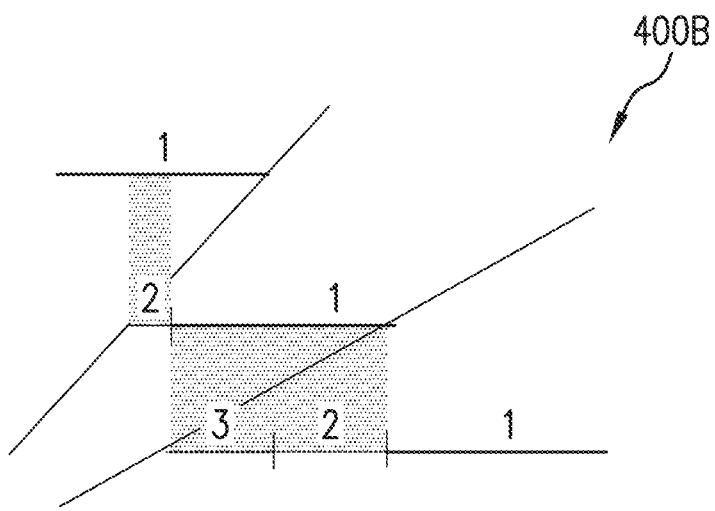

Returning to process 300 of FIG. 3, if it is otherwise determined in block 312 that the actual depth of the active surface is less than that of the lower ID surface, the active surface and the surface above are both truncated in block 314. For example, as shown in FIG. 4A, a section 410 of multi-Z horizon 400A corresponds to an area where a portion of the active surface (ID=2) has a depth that is less than that of a portion of the lower ID surface (ID=1) such that the portion of the active surface is located at a relatively higher depth position than the corresponding portion of the lower ID surface. Accordingly, both surfaces may be truncated by deleting the portions of the respective surfaces corresponding to section 410, as shown in FIG. 4B.

After the truncation of one or multiple surfaces is performed in block 310 or 314, respectively, process 300 may proceed to block 316, which includes setting the active surface to the next surface to be processed in the sequence, i.e., surface N−1 in this example. Process 300 may also proceed to block 316 if it is determined in blocks 308 and 312 that no portions of the active surface have a depth that is either equal to or less than that of the lower ID surface above. Once the active surface is set to the next surface to be processed in block 316, process 300 returns to block 304 and the above-described operations of process 300 may be repeated for the next active surface. Once While the operations in blocks 308, 310, 312 and 314 are described above with respect to the faulted multi-Z surfaces shown in the examples of FIGS. 4A and 4B, it should be appreciated that embodiments are not intended to be limited thereto and that the disclosed techniques, including the truncation performed in blocks 310 and 314, may also be applied to continuous multi-Z surfaces.

Figure 5A:
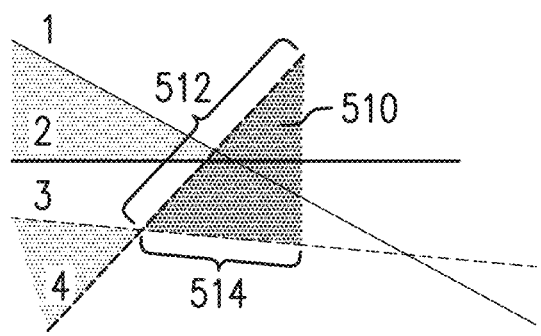
FIGS. 5A-5D are diagrams illustrating the truncation of continuous surfaces of a multi-Z horizon.
Figure 5B:
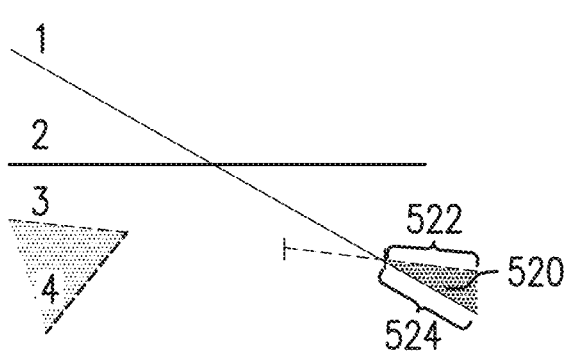

For example, FIGS. 5A-5D are diagrams illustrating the truncation performed in block 312 as applied to continuous surfaces of a multi-Z horizon. For purposes of the example as shown in FIGS. 5A-5D, it is assumed that the multi-Z horizon has a total of four surfaces and that each surface is processed in sequence, starting from the bottom-most surface (surface 4). Thus, in FIG. 5A, the active surface is set to surface 4 and the lower ID surface above surface 4 is surface 3. As shown in FIG. 5A, a portion 512 of surface 4 is located at a higher depth than a portion 514 of surface 3, where each portion corresponds to an edge of a triangular shaped section 510 of the multi-Z horizon. Accordingly, both surfaces may be truncated by deleting portions 512 and 514, as shown in FIG. 5B.

In FIG. 5B, the active surface is set to surface 3 and a section 520 of the multi-Z horizon denotes an area where a portion 522 of surface 3 is at a higher depth than a portion 524 of surface 1. Accordingly, surfaces 3 and 1 may be truncated by deleting portions 522 and 524, respectively. The resulting multi-Z horizon is shown in FIG. 5C.

Figure 5C:
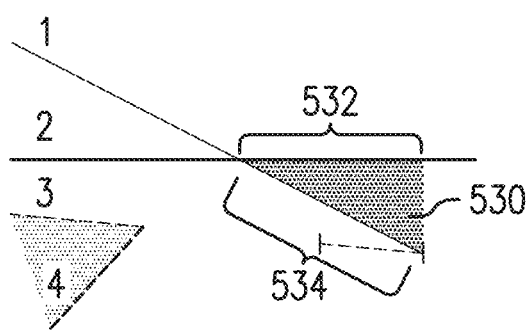
Figure 5D:
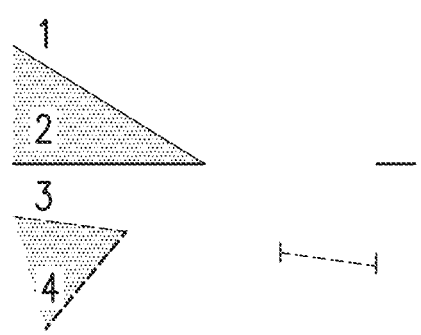

In FIG. 5C, the active surface is set to surface 2, the next surface to be processed. A section 530 of the multi-Z horizon as shown in FIG. 5C denotes an area where a portion 532 of surface 2 has a higher depth than a portion 534 of surface 1. Therefore, surfaces 2 and 1 are truncated by deleting portions 532 and 534, respectively. As no surfaces exist above surface 1, no other surfaces need to be processed. The resulting multi-Z horizon with the truncated surfaces is shown in FIG. 5D. While the remaining portions of surfaces 2 and 3 that were not deleted are shown in FIG. 5D, it should be appreciated that in some embodiments, any remaining portions of a truncated surface that are not already intersecting another surface of the multi-Z horizon may also be deleted. In some implementations, any remaining portion of a truncated surface having a length that is less than a predetermined minimum length may also be deleted.

Returning again to process 300 of FIG. 3, once all surfaces have been processed and it is determined that no other surfaces exist above the active surface (e.g., the active surface ID=1), process 300 may conclude by proceeding to block 210 of process 200 of FIG. 2.

Returning to FIG. 2, process 200 may conclude after block 210, in which the multi-Z horizon, including the auto-tracked surfaces, may be saved or stored in memory, e.g., as multi-Z horizon data 126 in memory 120 of FIG. 1, as described above. The stored multi-Z horizon data may include data for each of the auto-tracked surfaces after any truncation that may have been performed in block 208, e.g., using process 300 of FIG. 3, as described above. The examples shown in FIGS. 6A-9 will now be described to further illustrate the characteristics and features of the multi-Z auto-tracking techniques disclosed herein.

Figure 6A:
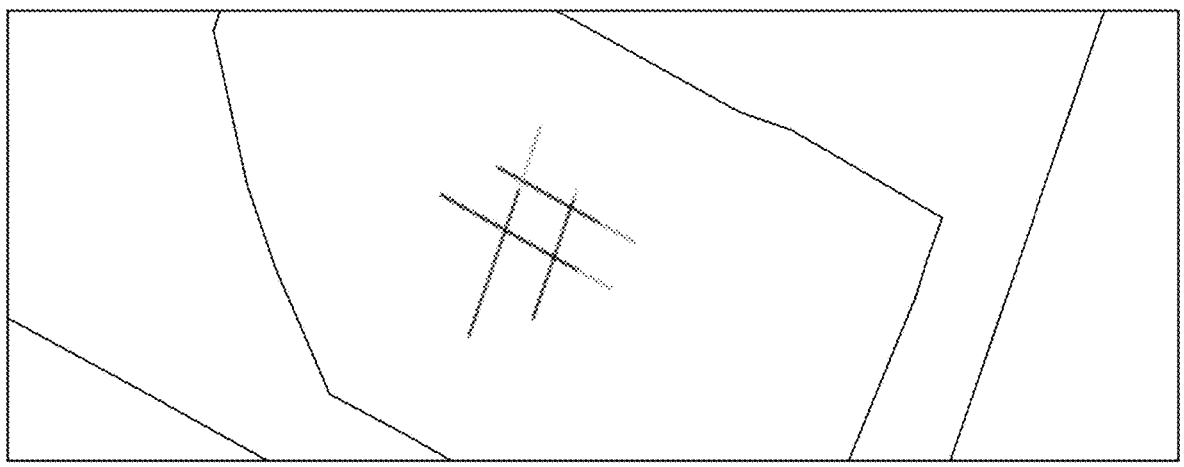
FIGS. 6A-6D are diagrams of illustrative seed data for a surface of a multi-Z horizon and various data hulls generated from the seed data.
Figure 6B:
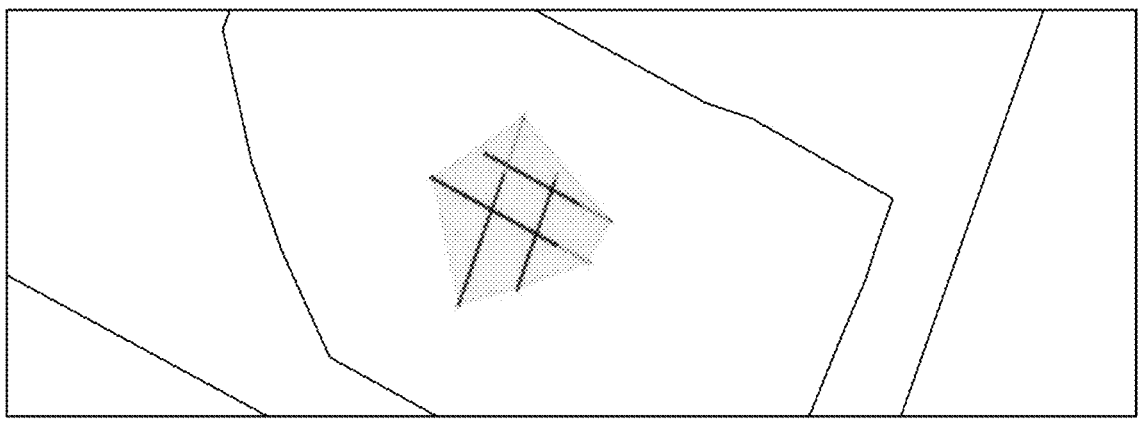
Figure 6C:
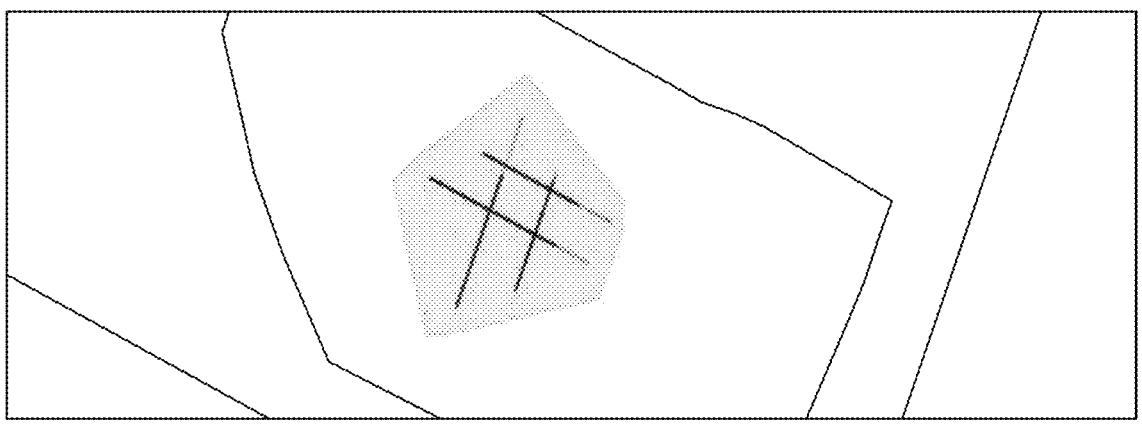
Figure 6D:
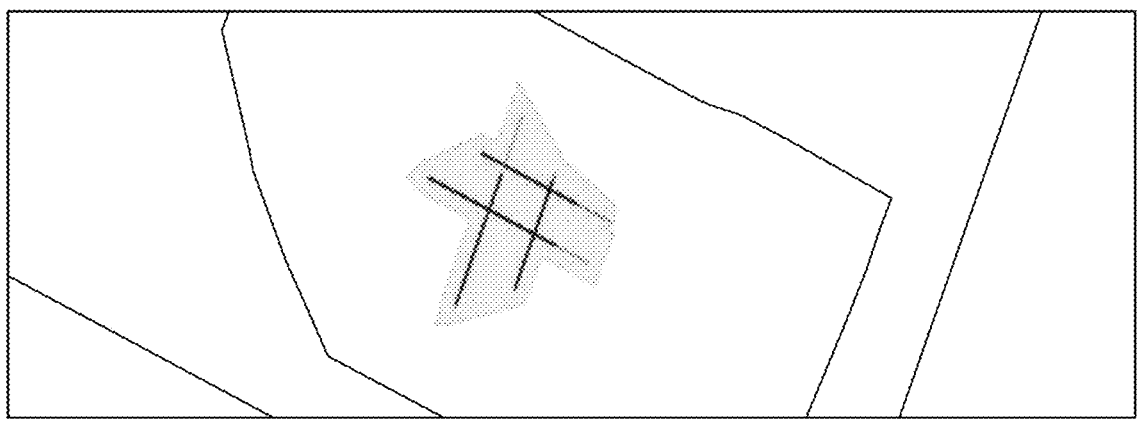

FIG. 6A is a diagram of illustrative horizon seed data for a surface or layer of a multi-Z horizon to be auto-tracked within a seismic volume. FIGS. 6B-6D are diagrams of various data hull polygons that may be generated from the seed data of FIG. 6A. The seed data in FIG. 6A may correspond to one or more surfaces picked by a user for interpreting a multi-Z horizon within a vertical seismic section. For example, the user may use a user input device coupled to the user's computing device to mark each surface by drawing a line on a representation of the seismic section displayed within a visualization window or interactive content area of a GUI.

FIG. 7 is a diagram of illustrative data hulls in the form of polygons for different surfaces of a multi-Z horizon 700. For example, multi-Z horizon 700 may have faulted surfaces on either side of a reverse fault 702. A data hull 710 may represent a first surface of multi-Z horizon 700 in this example and a data hull 720 may represent a second surface. Data hulls 710 and 720 may be used to auto-track the first and second surfaces, respectively, through a seismic volume, as shown in FIG. 8.

Figure 8:
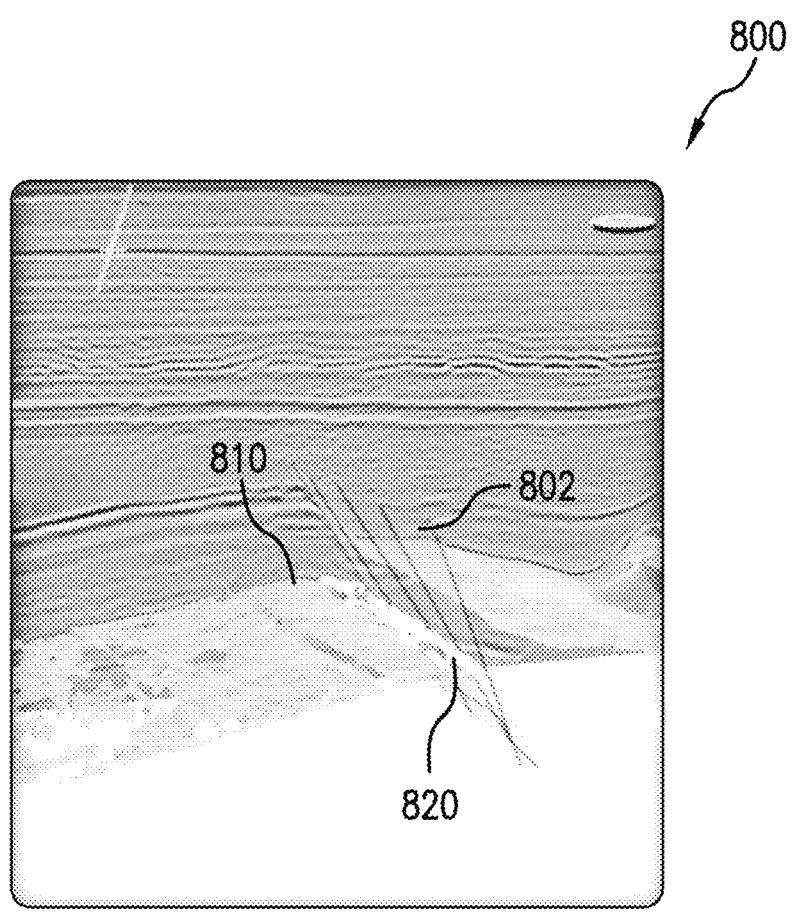
FIG. 8 is an illustrative visualization of auto-tracked surfaces of a multi-Z horizon, based on the bounding polygon of FIG. 7.

FIG. 8 is an illustrative visualization 800 of auto-tracked surfaces of multi-Z horizon 700. Accordingly, visualization 800 may include a visual representation 802 of reverse fault 702 in addition to representations for an auto-tracked surface 810 corresponding to the first surface of multi-Z horizon 700 (based on data hull 710) and an auto-tracked surface 820 corresponding to the second surface of multi-Z horizon 700 (based on data hull 720).

Figure 9:
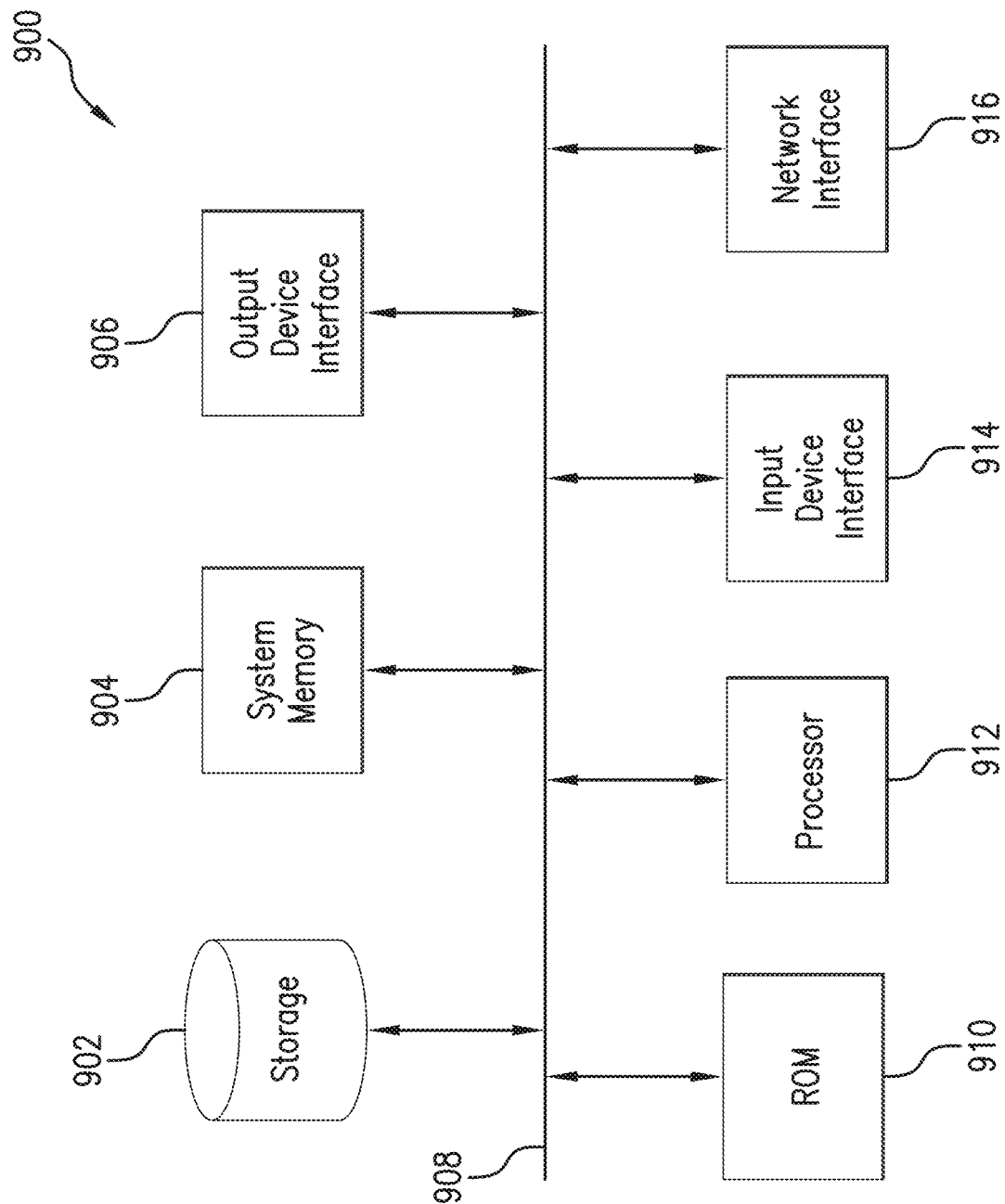
FIG. 9 is a block diagram of an illustrative computer system in which embodiments of the present disclosure may be implemented.

FIG. 9 is a block diagram illustrating an example of a computer system 900 in which embodiments of the present disclosure may be implemented. For example, processes 200 and 300 of FIGS. 2 and 3, respectively, as described above, may be implemented using system 900. System 900 can be a computer, phone, PDA, or any other type of electronic device. Such an electronic device includes various types of computer readable media and interfaces for various other types of computer readable media. As shown in FIG. 9, system 900 includes a permanent storage device 902, a system memory 904, an output device interface 906, a system communications bus 908, a read-only memory (ROM) 910, processing unit(s) 912, an input device interface 914, and a network interface 916.

Bus 908 collectively represents all system, peripheral, and chipset buses that communicatively connect the numerous internal devices of system 900. For instance, bus 908 communicatively connects processing unit(s) 912 with ROM 910, system memory 904, and permanent storage device 902.

From these various memory units, processing unit(s) 912 retrieves instructions to execute and data to process in order to execute the processes of the subject disclosure. The processing unit(s) can be a single processor or a multi-core processor in different implementations.

ROM 910 stores static data and instructions that are needed by processing unit(s) 912 and other modules of system 900. Permanent storage device 902, on the other hand, is a read-and-write memory device. This device is a non-volatile memory unit that stores instructions and data even when system 900 is off. Some implementations of the subject disclosure use a mass-storage device (such as a magnetic or optical disk and its corresponding disk drive) as permanent storage device 902.

Other implementations use a removable storage device (such as a floppy disk, flash drive, and its corresponding disk drive) as permanent storage device 902. Like permanent storage device 902, system memory 904 is a read-and-write memory device. However, unlike storage device 902, system memory 904 is a volatile read-and-write memory, such a random access memory. System memory 904 stores some of the instructions and data that the processor needs at runtime. In some implementations, the processes of the subject disclosure are stored in system memory 904, permanent storage device 902, and/or ROM 910. For example, the various memory units include instructions for computer aided pipe string design based on existing string designs in accordance with some implementations. From these various memory units, processing unit(s) 912 retrieves instructions to execute and data to process in order to execute the processes of some implementations.

Bus 908 also connects to input and output device interfaces 914 and 906. Input device interface 914 enables the user to communicate information and select commands to the system 900. Input devices used with input device interface 914 include, for example, alphanumeric, QWERTY, or T9 keyboards, microphones, and pointing devices (also called "cursor control devices"). Output device interfaces 906 enables, for example, the display of images generated by the system 900. Output devices used with output device interface 906 include, for example, printers and display devices, such as cathode ray tubes (CRT) or liquid crystal displays (LCD). Some implementations include devices such as a touchscreen that functions as both input and output devices. It should be appreciated that embodiments of the present disclosure may be implemented using a computer including any of various types of input and output devices for enabling interaction with a user. Such interaction may include feedback to or from the user in different forms of sensory feedback including, but not limited to, visual feedback, auditory feedback, or tactile feedback. Further, input from the user can be received in any form including, but not limited to, acoustic, speech, or tactile input. Additionally, interaction with the user may include transmitting and receiving different types of information, e.g., in the form of documents, to and from the user via the above-described interfaces.

Also, as shown in FIG. 9, bus 908 also couples system 900 to a public or private network (not shown) or combination of networks through a network interface 916. Such a network may include, for example, a local area network ("LAN"), such as an Intranet, or a wide area network ("WAN"), such as the Internet. Any or all components of system 900 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself. Accordingly, processes 200 and 300 of FIGS. 2 and 3, respectively, as described above, may be implemented using system 900 or any computer system having processing circuitry or a computer program product including instructions stored therein, which, when executed by at least one processor, causes the processor to perform functions relating to these methods.

As used in this specification and any claims of this application, the terms "computer", "server", "processor", and "memory" all refer to electronic or other technological devices. These terms exclude people or groups of people. As used herein, the terms "computer readable medium" and "computer readable media" refer generally to tangible, physical, and non-transitory electronic storage mediums that store information in a form that is readable by a computer.

In one or more embodiments, system 900 may be used to implement the disclosed multi-Z auto-tracking techniques as a component of a distributed computing system, for example, as a back end component, e.g., a data server, as a middleware component, e.g., an application server, or as a front end component, e.g., a client computer having a graphical user interface or a Web browser through which a user can interact with an implementation of the subject matter described in this specification. In some implementations, the multi-Z auto-tracking functionality according to the disclosed techniques may be provided using any combination of such back end, middleware, and front end components of the distributed system. The components of the distributed system may be interconnected by any form or medium of digital data communication, e.g., a communication network. Examples of communication networks include, but are not limited to, a local area network ("LAN") and a wide area network ("WAN"), an inter-network (e.g., the Internet), and peer-to-peer networks (e.g., ad hoc peer-to-peer networks).

However, it should be appreciated that the distributed computing system can include any number of clients and/or servers. A client and server are generally remote from each other and typically interact through a communication network. The relationship of client and server may arise by virtue of computer programs running on the respective computers and having a client-server relationship to each other. In some embodiments, a server transmits data (e.g., a web page) to a client device (e.g., for purposes of displaying data to and receiving user input from a user interacting with the client device). Data generated at the client device (e.g., a result of the user interaction) can be received from the client device at the server. In one or more embodiments, such a client device of the distributed computing system may be associated with a drilling system for performing downhole operations at a well site, as will be described in further detail below with respect to FIG. 10.

Figure 10:
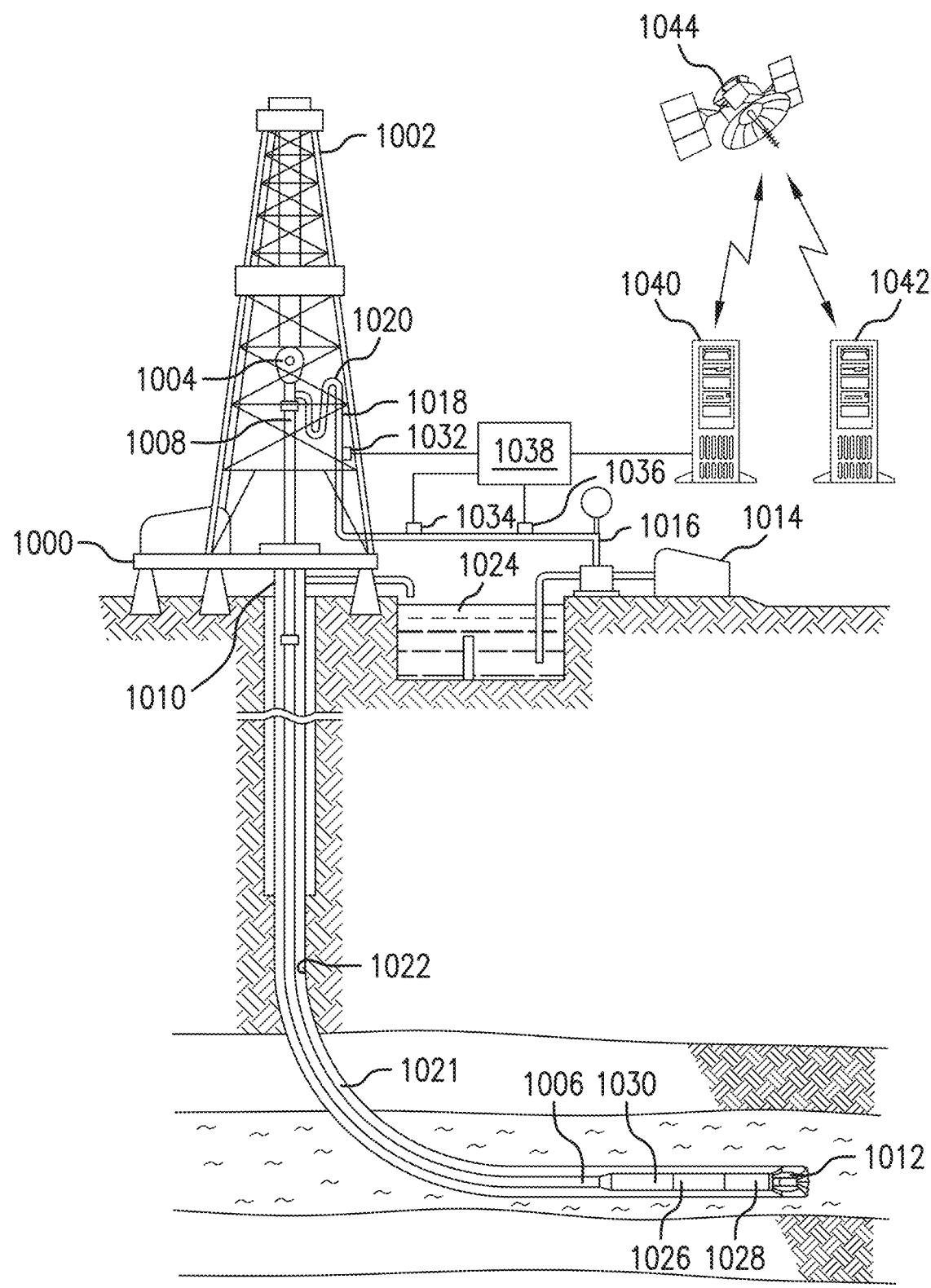
FIG. 10 is a diagram of an illustrative drilling system in which embodiments of the present disclosure may be implemented as part of a downhole operation performed at a well site.

FIG. 10 is a diagram of an illustrative drilling system in which embodiments of the present disclosure may be implemented as part of a downhole operation performed at a well site. For example, the disclosed embodiments may be incorporated as part of an overall seismic interpretation and well planning workflow for performing one or more downhole operations at a well site. Such downhole operations may include, but are not limited to, drilling, completion and injection stimulation operations for recovering petroleum, oil and/or gas, deposits from a hydrocarbon bearing formation. As shown in FIG. 10, a drilling platform 1000 is equipped with a derrick 1002 that supports a hoist 1004. Drilling in accordance with some embodiments is carried out by a string of drill pipes connected together by "tool" joints so as to form a drill string 1006. Hoist 1004 suspends a top drive 1008 that is used to rotate drill string 1006 as the hoist lowers the drill string through wellhead 1010. Connected to the lower end of drill string 1006 is a drill bit 1012. Drill bit 1012 is rotated and drilling of a wellbore 1022 is accomplished by rotating drill string 1006, e.g., by top drive 1008 or by use of a downhole "mud" motor (not shown) near drill bit 1012 that turns the drill bit or by a combination of both top drive 1008 and a downhole mud motor. Drilling fluid is pumped by mud pump 1014 through flow line 1016, stand pipe 1018, goose neck 1020, top drive 1008, and down through drill string 1006 at high pressures and volumes to emerge through nozzles or jets in drill bit 1012. The drilling fluid then travels back up the wellbore via an annulus 1021 formed between the exterior of drill string 1006 and the wall of wellbore 1022, through a blowout preventer (not specifically shown), and into a mud pit 1024 on the surface. On the surface, the drilling fluid is cleaned and then circulated again by mud pump 1014. The drilling fluid is used to cool drill bit 1012, to carry cuttings from the base of the borehole to the surface, and to balance the hydrostatic pressure in the rock formations.

In accordance with the various embodiments, drill string 1006 may include various tools which create sensor data, such as a LWD tool 1026 and a MWD tool 1028. The distinction between LWD and MWD is sometimes blurred in the industry, but for purposes of this example, it may be assumed that LWD tool 1026 is used to measure properties of the surrounding formation (e.g., porosity, permeability), and MWD tool 1028 is used to measure properties associated with wellbore 1022 (e.g., inclination, and direction). Tools 1026 and 1028 may be coupled to a telemetry device 1030 that transmits data to the surface. Tools 1026 and 1028 along with telemetry device 1030 may be housed within a bottom hole assembly (BHA) attached to the end of drill string 1006.

In addition to measurements collected by downhole tools 1026 and 1028, a seismic survey may be conducted to provide seismic mapping of the subsurface formation in this example. In order to conduct a seismic survey, one or more seismic source devices (not shown) at the surface of the formation generates seismic waves which travel into the subsurface layers. Such source devices may include, for example and without limitation, dynamite or other explosives, thumper trucks, air guns, or other noise sources. The seismic waves partially reflect off the subsurface geological features, e.g., horizons and faults, encountered by the seismic waves. The seismic waves reflected back towards the earth's surface are received by an array of seismic receivers, e.g., geophones, and arrival times and amplitudes are recorded.

Such a surface seismic survey may serve as an initial exploratory survey conducted over a relatively large area of the formation in order to obtain a low resolution mapping of the formation's geometry. Such a broad-based seismic survey may be used in conjunction with core samples and/or well logs from one or more exploratory wellbores for purposes of hydrocarbon exploration and well planning. From the initial exploratory survey, a target area within the formation may be selected for further exploration and well planning purposes. A more detailed vertical seismic profile (VSP) survey of the selected target area may then be conducted. To conduct the VSP survey, the waves of seismic energy and direct arrival times from the seismic source devices at the surface may be detected and recorded by an array of seismic receivers (not shown) disposed within wellbore 1022. In some implementations, the seismic receivers may be downhole seismic sensors, e.g., geophones or hydrophones, coupled to or integrated within the BHA of drill string 1006 alongside telemetry device 1030 and downhole tools 1026 and 1028.

In one or more embodiments, telemetry module 1030 may any of various communication techniques to send the sensor data collected downhole to the surface. For example, in some cases, telemetry module 1030 may send the sensor data to the surface using electromagnetic telemetry. In other cases, telemetry module 1030 may send the data by way of electrical or optical conductors embedded in the pipes that make up drill string 1006. In yet still other cases, telemetry module 1030 modulates a resistance to drilling fluid flow within the drill string to generate pressure pulses that propagate at the speed of sound of the drilling fluid to the surface, and where the sensor data is encoded in the pressure pulses.

In the mud pulse telemetry example above, one or more transducers, such as transducers 1032, 1034 and/or 1036, convert the pressure signal into electrical signals for a signal digitizer 1038 (e.g., an analog to digital converter). Additional surface-based sensors creating sensor data (e.g., RPM measuring devices, drilling pressure measuring devices, mud pit level measuring devices) may also be present, but are not shown so as not to further complicate the figure. Digitizer 1038 supplies a digital form of the many sensor measurements to a computer 1040, e.g., computer system 900 of FIG. 9, as described above, or some other form of a data processing device. Computer 1040 operates in accordance with software (which may be stored on a computer-readable storage medium) to process and decode the received signals, and to perform prediction of operational outcomes based on the models created as discussed above.

In accordance with at least some embodiments, at least a portion of the sensor data from the drilling operation may be applied (by computer system 1040) to the one or models and predictions of operational outcomes are made. The predictions may assist a driller in making changes and/or corrections to the drilling parameters, such as directional changes or changes to better control an operational outcome, e.g., adjusting a path of a changes of weight on bit to control rate of penetration (ROP). In yet still other example embodiments, the surface computer 1040 may gather sensor data and then forward the sensor data to another computer system 1042, such as a backend computer system operated by an oilfield services provider by way of a remote connection, e.g., for purposes of remotely monitoring and controlling well site operations via a communication network. Using the sensor data, the computer system 1042 may run the models to predict the operational outcome in the drilling operation, and provide the predicted operational outcome to the driller through the computer system 1040. The communication of data between computer system 1040 and computer system 1042 may take any suitable form, such as over the Internet, by way of a local or wide area network, or as illustrated over a satellite 1044 link.

In one or more embodiments, computer 1040 may function as a control system for monitoring and controlling downhole operations at the well site. Computer 1040 may be implemented using any type of computing device having at least one processor and a memory. Computer 1040 may process and decode the digital signals received from digitizer 1038 using an appropriate decoding scheme. For example, the digital signals may be in the form of a bit stream including reserved bits that indicate the particular encoding scheme that was used to encode the data downhole. Computer 1040 can use the reserved bits to identify the corresponding decoding scheme to appropriately decode the data. The resulting decoded telemetry data may be further analyzed and processed by computer 1040 to display useful information to a well site operator. For example, a driller could employ computer 1040 to obtain and monitor the position and orientation of the BHA (or one or more of its components), other drilling parameters, and/or one or more formation properties of interest over the course of the drilling operation. It should be appreciated that computer 1040 may be located at the surface of the well site, e.g., near drilling rig 1000, or at a remote location away from the well site.

In addition to transmitting information collected downhole to the surface, telemetry device 1030 may receive information from the surface over one or more of the above-described communication channels. The information received from the surface may include, for example, signals for controlling the operation of the BHA or individual components thereof. Such control signals may be used, for example, to update operating parameters of the BHA for purposes of adjusting a planned trajectory or path of wellbore 1022 through the formation during different stages of the drilling operation. In one or more embodiments, the control signals may be representative of commands input by a well site operator for making adjustments to the planned path or controlling various operational variables of the drilling operation as downhole conditions change over time. As described above, such operational variables may include, but are not limited to, weight on bit, drilling fluid flow through the drill pipe, the drill string rotational speed, and the density and viscosity of the drilling fluid.

In one or more embodiments, computer 1040 may provide an interface enabling the well site operator at the surface to receive indications of downhole operating conditions and controllable parameters and adjust one or more of the parameters accordingly. The interface may be include a display for presenting relevant information, e.g., values of drilling parameters or operational variables, to the operator during the drilling operation as well as a user input device (e.g., a mouse, keyboard, touch-screen, etc.) for receiving input from the operator. As downhole operating conditions may continually change over the course of the operation, the operator may use the interface provided by computer 1040 to react to such changes in real time by adjusting selected drilling parameters in order to increase and/or maintain drilling efficiency and thereby, optimize the drilling operation.

In one or more embodiments, computer 1040 may execute a well planning application for automating well planning and data analysis workflows during both planning and implementation phases of a downhole operation performed along a planned path of a wellbore through a subsurface formation. In some implementations, the well planning application may incorporate the multi-Z horizon auto-tracking functionality described above as part of a seismic interpretation module of the application. A GUI of such a well planning and seismic interpretation application may be used to provide the multi-Z auto-tracking functionality as part of a seismic interpretation and Earth modeling workflow. Such a workflow may involve using the results of the seismic interpretation to generate a 2D or 3D model of the subsurface formation or to update an existing model. The generated or updated formation model may then be used to identify or modify potential targets within the formation for hydrocarbon exploration and production operations and adjust the planned path of the wellbore accordingly.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Furthermore, the exemplary methodologies described herein may be implemented by a system including processing circuitry or a computer program product including instructions which, when executed by at least one processor, causes the processor to perform any of the methodology described herein.

As described above, embodiments of the present disclosure are particularly useful for automatically tracking multi-Z horizons within seismic volumes. In one embodiment of the present disclosure, a method of automatically tracking multi-Z horizons within seismic volumes includes: obtaining seed data for each of a plurality of surfaces of a multi-Z horizon within a seismic volume; generating a data hull for each surface based on the obtained seed data; determining a tracking region within the seismic volume, based on the generated data hull; automatically tracking each surface of the multi-Z horizon through the tracking region; and upon determining that one or more of the plurality of surfaces violate at least one geological boundary rule associated with the plurality of surfaces, truncating the one or more surfaces such that each surface of the multi-Z horizon honors the geological boundary rule within the seismic volume. In another embodiment of the present disclosure, a computer-readable storage medium having instructions stored therein is disclosed, where the instructions, when executed by a computer, cause the computer to perform a plurality of functions, including functions to: obtain seed data for each of a plurality of surfaces of a multi-Z horizon within a seismic volume; generate a data hull for each surface based on the obtained seed data; determine a tracking region within the seismic volume, based on the generated data hull; automatically track each surface of the multi-Z horizon through the tracking region; determine whether or not one or more of the plurality of surfaces violate at least one geological boundary rule associated with the plurality of surfaces; and when it is determined that one or more surfaces violate the at least one geological boundary rule, truncate the one or more of surfaces such that each surface of the multi-Z horizon honors the at least one geological boundary rule within the seismic volume.

In one or more embodiments of the foregoing method and/or computer-readable storage medium: the data hull may be a polygon specifying boundaries of the tracking region within the seismic volume; the plurality of surfaces of the multi-Z horizon may include at least one pair of consecutive surfaces; the multi-Z horizon may represent a geological structure of a subsurface formation; the geological structure may be selected from the group consisting of: a reverse fault, a salt body, and overturned beds; the seed data for each surface of the multi-Z horizon may include one or more seed points selected by a user within the seismic volume; and each of the one or more seed points may represent a location on a seismic data trace at a depth corresponding to at least one surface of the multi-Z horizon.

Furthermore, a system is disclosed, where the system includes at least one processor and a memory coupled to the processor having instructions stored therein, which when executed by the processor, cause the processor to perform functions including functions to: obtain seed data for each of a plurality of surfaces of a multi-Z horizon within a seismic volume; generate a data hull for each surface based on the obtained seed data; determine a tracking region within the seismic volume, based on the generated data hull; automatically track each surface of the multi-Z horizon through the tracking region; determine whether or not one or more of the plurality of surfaces violate at least one geological boundary rule associated with the plurality of surfaces; and when it is determined that one or more surfaces violate the at least one geological boundary rule, truncate the one or more of surfaces such that each surface of the multi-Z horizon honors the at least one geological boundary rule within the seismic volume.

In one or more embodiments of the foregoing system: the data hull may be a polygon specifying boundaries of the tracking region within the seismic volume; the plurality of surfaces of the multi-Z horizon may include at least one pair of consecutive surfaces; the multi-Z horizon may represent a geological structure of a subsurface formation; the geological structure may be selected from the group consisting of: a reverse fault, a salt body, and overturned beds; the seed data for each surface of the multi-Z horizon may include one or more seed points selected by a user within the seismic volume; and each of the one or more seed points may represent a location on a seismic data trace at a depth corresponding to at least one surface of the multi-Z horizon.

While specific details about the above embodiments have been described, the above hardware and software descriptions are intended merely as example embodiments and are not intended to limit the structure or implementation of the disclosed embodiments. For instance, although many other internal components of computer system 900 of FIG. 9 or components of the drilling system of FIG. 10 are not shown, those of ordinary skill in the art will appreciate that such components and their interconnection are well known.

In addition, certain aspects of the disclosed embodiments, as outlined above, may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Additionally, the flowchart and block diagrams in the figures illustrate the architecture, functionality, and operation of possible implementations of systems, methods and computer program products according to various embodiments of the present disclosure. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The above specific example embodiments are not intended to limit the scope of the claims. The example embodiments may be modified by including, excluding, or combining one or more features or functions described in the disclosure.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The illustrative embodiments described herein are provided to explain the principles of the disclosure and the practical application thereof, and to enable others of ordinary skill in the art to understand that the disclosed embodiments may be modified as desired for a particular implementation or use. The scope of the claims is intended to broadly cover the disclosed embodiments and any such modification.

What is claimed is:

1. A method of automatically tracking multi-Z horizons within a seismic volume, the method comprising:
   obtaining seed data for each of a plurality of surfaces of a multi-Z horizon within the seismic volume, the multi-Z horizon representing a geological structure of a subsurface formation;
   generating a data hull for each surface based on the obtained seed data;
   determining a tracking region within the seismic volume, based on the generated data hull;
   automatically tracking each surface in the plurality of surfaces of the multi-Z horizon through the tracking region;
   determining whether or not one or more of the plurality of surfaces violate at least one geological boundary rule associated with the plurality of surfaces, based on the automatically tracked surfaces of the multi-Z horizon; and
   responsive to determining that one or more surfaces violate the at least one geological boundary rule, truncating the one or more surfaces such that each surface of the multi-Z horizon honors the geological boundary rule within the seismic volume.

2. The method of claim 1, wherein the data hull is a polygon specifying boundaries of the tracking region within the seismic volume.

3. The method of claim 1, wherein the plurality of surfaces of the multi-Z horizon include at least one pair of consecutive surfaces.

4. The method of claim 1 wherein the geological structure is selected from the group consisting of: a reverse fault, a salt body, and overturned beds.

5. The method of claim 1, wherein the seed data for each surface of the multi-Z horizon includes one or more seed points selected by a user within the seismic volume.

6. The method of claim 5, wherein each of the one or more seed points represents a location on a seismic data trace at a depth corresponding to at least one surface of the multi-Z horizon.

7. A system comprising:
a processor; and
a memory having processor-readable instructions stored therein, which, when executed by the processor, cause the processor to perform a plurality of functions, including functions to:
   obtain seed data for each of a plurality of surfaces of a multi-Z horizon within a seismic volume, the multi-Z horizon representing a geological structure of a subsurface formation;
   generate a data hull for each surface based on the obtained seed data;
   determine a tracking region within the seismic volume, based on the generated data hull;
   automatically track each surface in the plurality of surfaces of the multi-Z horizon through the tracking region;
   determine whether or not one or more of the plurality of surfaces violate at least one geological boundary rule associated with the plurality of surfaces, based on the automatically tracked surfaces of the multi-Z horizon; and
   when it is determined that one or more surfaces violate the at least one geological boundary rule, truncate the one or more of surfaces such that each surface of the multi-Z horizon honors the at least one geological boundary rule within the seismic volume.

8. The system of claim 7, wherein the data hull is a polygon specifying boundaries of the tracking region within the seismic volume.

9. The system of claim 7, wherein the plurality of surfaces of the multi-Z horizon include a pair of consecutive surfaces corresponding to a top surface and a base surface.

10. The system of claim 8, wherein the geological structure is selected from the group consisting of: a reverse fault, a salt body, and overturned beds.

11. The system of claim 7, wherein the seed data for each surface of the multi-Z horizon includes one or more seed points selected by a user within the seismic volume.

12. The system of claim 11, wherein each of the one or more seed points represents a location on a seismic data trace at a depth corresponding to at least one surface of the multi-Z horizon.

13. A non-transitory computer-readable storage medium comprising computer-readable instructions stored therein, which, when executed by a computer, cause the computer to perform a plurality of functions, including functions to:
   obtain seed data for each of a plurality of surfaces of a multi-Z horizon within a seismic volume, the multi-Z horizon representing a geological structure of a subsurface formation;
   generate a data hull for each surface based on the obtained seed data;
   determine a tracking region within the seismic volume, based on the generated data hull;
   automatically track each surface in the plurality of surfaces of the multi-Z horizon through the tracking region;
   determine whether or not one or more of the plurality of surfaces violate at least one geological boundary rule associated with the plurality of surfaces, based on the automatically tracked surfaces of the multi-Z horizon; and
   when it is determined that one or more surfaces violate the at least one geological boundary rule, truncate the one or more of surfaces such that each surface of the multi-Z horizon honors the at least one geological boundary rule within the seismic volume.

14. The non-transitory computer-readable storage medium of claim 13, wherein the data hull is a polygon specifying boundaries of the tracking region within the seismic volume.

15. The non-transitory computer-readable storage medium of claim 13, wherein the plurality of surfaces of the multi-Z horizon include a pair of consecutive surfaces corresponding to a top surface and a base surface.

16. The non-transitory computer-readable storage medium of claim 13, wherein the seed data for each surface of the multi-Z horizon includes one or more seed points selected by a user within the seismic volume, and each of the one or more seed points represents a location on a seismic data trace at a depth corresponding to at least one surface of the multi-Z horizon.

17. The non-transitory computer-readable storage medium of claim 13, wherein the geological structure is selected from the group consisting of: a reverse fault, a salt body, and overturned beds.

\* \* \* \* \*

UNITED STATES PATENT AND TRADEMARK OFFICE
CERTIFICATE OF CORRECTION

PATENT NO. : 11,294,085 B2
APPLICATION NO. : 16/344345
DATED : April 5, 2022
INVENTOR(S) : Nam Xuan Nguyen, Kainan Wang and Xuewei Tan It is certified that error appears in the above-identified patent and that said Letters Patent is hereby corrected as shown below:

In the Specification

Column 1, Line 6, change:
"This application claims priority to U.S. Provisional Application No. 62/424,334, filed on Nov. 18, 2016, the benefit of which is claimed and the disclosure of which is incorporated herein by reference in its entirety."

To:
-- This application is a U.S. national stage patent application of International Patent Application No. PCT/US2017/057686, filed on October 20, 2017, which claims priority to U.S. Provisional Application No. 62/424,334, filed on November 18, 2016, the benefit of both of which are claimed and the disclosures of both of which are incorporated herein by reference in their entireties. --

Signed and Sealed this
Twenty-first Day of June, 2022

Katherine Kelly Vidal
*Director of the United States Patent and Trademark Office*